C. P. LANDES.
VEHICLE.
APPLICATION FILED FEB. 19, 1918.
1,366,393.
Patented Jan. 25, 1921.
2 SHEETS—SHEET 2.
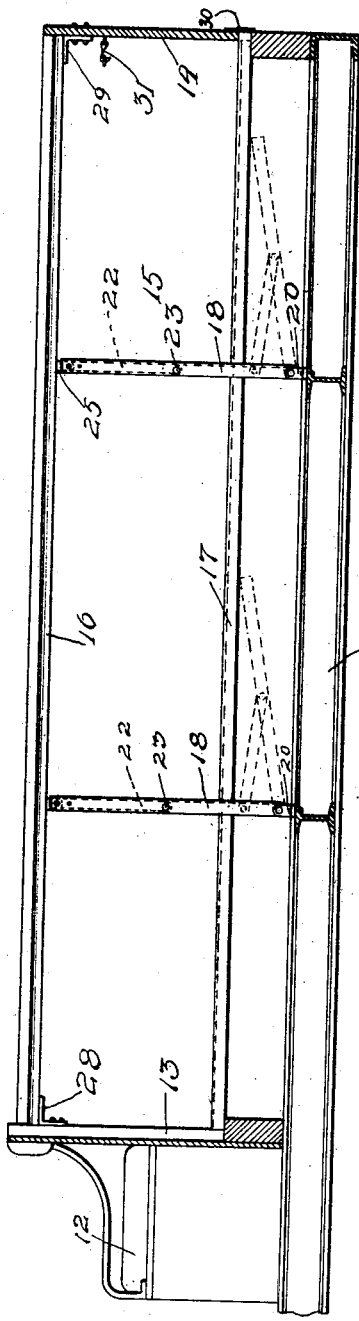
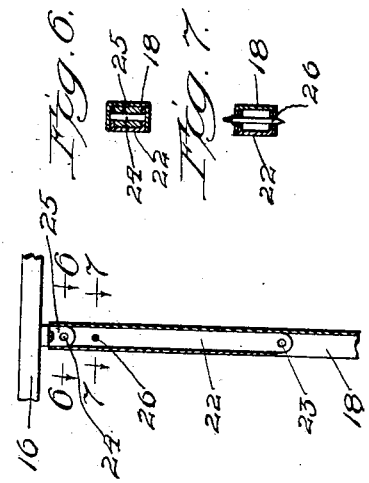
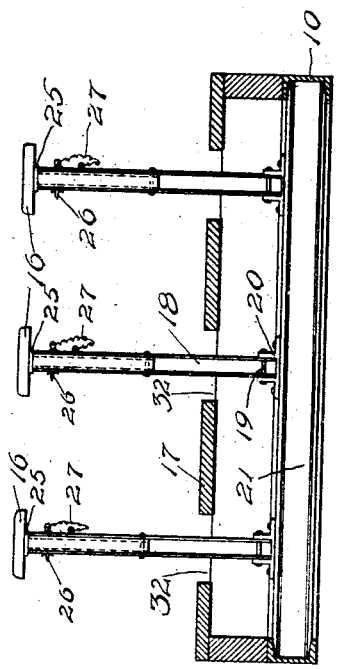
Witness:
Harry S. Gaither
Inventor:
Charles P. Landes
by Blemming & Blemming
Attys

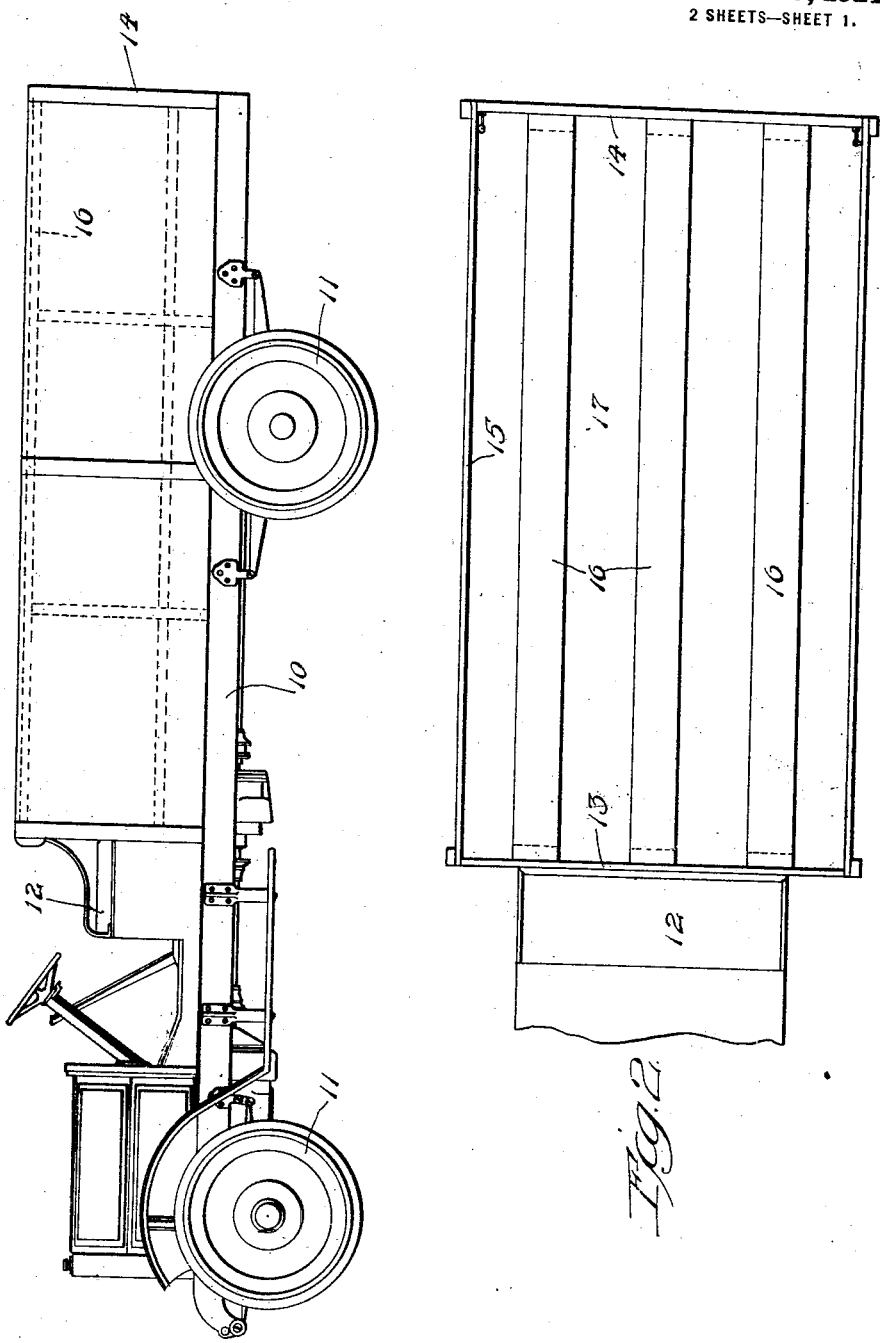

UNITED STATES PATENT OFFICE.

CHARLES P. LANDES, OF CHICAGO, ILLINOIS.

VEHICLE.

1,366,393. Specification of Letters Patent. Patented Jan. 25, 1921.

Application filed February 19, 1918. Serial No. 218,043.

*To all whom it may concern:*

Be it known that I, CHARLES P. LANDES, a citizen of the United States, residing at Chicago, in the county of Cook and State of Illinois, have invented certain new and useful Improvements in Vehicles, of which the following is a specification.

This invention relates to a vehicle intended primarily for military use, and is concerned particularly with certain arrangements and combinations of its parts by which the vehicle may be adapted to either freight or passenger service.

It is especially important in vehicles of the kind under consideration that accommodations be provided for the maximum number of troops, and that the operation of loading and unloading should be accomplished in the speediest manner possible. It is also desirable that conversion of the vehicle from passenger to freight service, or vice-versa, should be readily and simply effected, and that when converted to one use, the characteristics which adapt it for the other use should entirely disappear. With these ends in view, I have devised a vehicle which embodies certain new and improved features by which the operations of conversion are greatly facilitated, and by which the vehicle may accommodate either passengers or freight without any substantial increase in the number of its component parts. These and other objects of my invention will more fully hereinafter appear from the detailed description to follow, and from the accompanying drawings, in which:

Figure 1 is a side elevation of a vehicle embodying the features of my invention, showing its conversion for passenger use;

Fig. 2 is a plan view of the vehicle, the forward parts which have no direct relation to my invention being omitted from the figure;

Fig. 3 is an enlarged side elevation of the parts shown in Fig. 1, dotted lines being used to indicate the lowered position of the seats;

Fig. 4 is a transverse section through the vehicle;

Fig. 5 is an enlarged fragmentary view, in longitudinal section, showing a portion of one of the seat supports;

Fig. 6 is a horizontal section taken on line 6—6 of Fig. 5; and

Fig. 7 is a view similar to Fig. 6, taken on line 7—7 of Fig. 5.

For the purpose of clearly illustrating my invention, I have shown in Fig. 1 an automobile truck having a chassis 10 suitably mounted on wheels 11, and supporting a body on which is a driver's seat 12 in convenient proximity to the controls. Rearwardly of this seat is a wall 13 extending transversely across the vehicle, a tail gate 14 being also mounted at the extreme rear end of the body. Secured along the edges of the body are sides 15, either closed or slatted as may be desired, and preferably removable or swingingly mounted so as to not interfere with the loading or unloading operations.

The seats designed for passengers are arranged longitudinally of the vehicle in a manner somewhat similar to that shown and described in my pending application, Serial No. 178,153, filed July 2, 1917, and are represented as three in number. Since in all essential respects they are alike I have designated each seat by the numeral 16. In the construction shown, these seats are supported in elevated position above the level of the body platform 17 by means of novel supports, each consisting of a channel iron 18 pivoted as at 19 within a bearing member 20 which is shown as mounted on one of the transverse beams 21 of the chassis, although its mounting on the body directly is optional; and a second channel iron 22 of shorter length pivoted at one end as at 23 to the support 18 intermediate its ends, the other end of the iron 22 being pivoted as at 24 to a bearing member 25 secured to the under side of the seat 16. When the seats are fully elevated the iron 22 will fold between the flanges of the channel iron 18, as best shown in Figs. 3 and 5, a locking pin 26 attached to a chain 27 being inserted through registering openings in these two irons to prevent swinging movement of one with respect to the other. It will be understood that as many vertical supports are provided for the seats as may be required to sustain the load which they are designed to carry, the drawings showing, for convenience, two such supports. Additional end supports may also be used, such as are provided by an angle iron 28, secured to the rear side of the forward wall 13 and another angle iron 29 carried upon the tail gate 14. As appears best in Fig. 3 this tail gate is hinged as at 30 so as to be capable of swinging downwardly when required, a locking device 31 being employed to hold the tail gate against such movement when the seats are elevated.

From the foregoing description, the operations of raising and lowering the seats should be clear. To lower the seats the tail gate is first dropped permitting each seat to move rearwardly a sufficient distance to clear the angle iron 28; the locking pins 26 are then withdrawn to permit the irons 18 to swing backward and the irons 22 to swing forward until the seats have been fully lowered to the level of the platform 17 where they may lie within suitable recesses 32 therein in flush relation with the platform. Obviously the raising of the seats may be accomplished by a reversal of the operations described.

In the construction shown and described, the character of the vehicle is entirely transformed whenever the seats are raised or lowered, in the one instance accommodations for passengers being provided, and in the other the body being adapted to receive freight. Because of these characteristics, a vehicle of this kind is particularly advantageous and suited for the special requirements of military use. While certain modifications are clearly possible without departing from the spirit of my invention, such changes should be considered within its scope as more clearly defined in the appended claims, as follows:

I claim:

1. A vehicle having a body platform, a transverse wall near the forward end and a tail gate movably arranged at its rear end, means for locking the tail gate in upright position, a longitudinal seat extending between the wall and tail gate, supports fixedly secured to the wall and tail gate for sustaining the seat ends, and a swinging support intermediate the seat ends pivotally secured to the body and the seat, the seat support operating to lower the seat when the tail gate has been moved from normal position, substantially as described.

2. A vehicle of the kind described having in combination a chassis and a platform with longitudinal slots therein above the chassis, seats arranged above the platform and having supporting means therefor adapted to permit the seats to lower into the platform slots, said supporting means consisting in each instance of two elements of unequal length, one pivoted to the chassis and the other to the seat, the shorter element being pivoted to the other at a point intermediately of the ends thereof, and a locking connection between the elements removed from their point of pivotal connection, substantially as described.

CHARLES P. LANDES.

Witness:
EPHRAIM BANNING.